(12) United States Patent
Park

(10) Patent No.: US 7,274,649 B2
(45) Date of Patent: Sep. 25, 2007

(54) HOLOGRAPHIC ROM SYSTEM

(75) Inventor: Joo-Youn Park, Seoul (KR)

(73) Assignee: Daewoo Electronics Corp., Seoul (KR)

( * ) Notice: Subject to any disclaimer, the term of this patent is extended or adjusted under 35 U.S.C. 154(b) by 534 days.

(21) Appl. No.: 10/847,879

(22) Filed: May 19, 2004

(65) Prior Publication Data

US 2004/0238643 A1 Dec. 2, 2004

(30) Foreign Application Priority Data

May 31, 2003 (KR) ........................ 10-2003-0035037

(51) Int. Cl.
*G11B 7/00* (2006.01)
(52) U.S. Cl. .................... 369/118; 369/103; 369/112.22
(58) Field of Classification Search ................ 369/103, 369/118, 112.22, 112.23, 44.24
See application file for complete search history.

(56) References Cited

U.S. PATENT DOCUMENTS

| 3,530,442 | A |   | 9/1970 | Collier et al. ................ 340/173 |
|---|---|---|---|---|
| 5,793,734 | A | * | 8/1998 | Tsuchiya et al. ............. 369/118 |
| 6,452,890 | B2 |   | 9/2002 | Kawano et al. |
| 2002/0015376 | A1 |   | 2/2002 | Liu et al. ...................... 369/103 |

FOREIGN PATENT DOCUMENTS

| EP | 0936604 |   | 8/1999 |
|---|---|---|---|
| EP | 1 271 266 A2 |   | 2/2003 |
| JP | 10302294 A | * | 11/1998 |
| JP | 10-340479 |   | 12/1998 |
| JP | 200-259070 |   | 9/2000 |
| KR | 2000-0015991 |   | 3/2000 |
| WO | WO99/16063 |   | 4/1999 |

\* cited by examiner

*Primary Examiner*—Thang V. Tran
(74) *Attorney, Agent, or Firm*—Bacon & Thomas, PLLC

(57) ABSTRACT

A holographic ROM system of the present invention includes a lens unit for filtering and collimating an output radiation diffracted from a holographic disk in order to produce an output data beam. The lens unit includes an objective lens for collimating the output radiation and a filtering film for filtering the output radiation. The objective lens and the filtering film are formed in a single body.

10 Claims, 4 Drawing Sheets

HOLOGRAPHIC ROM SYSTEM

FIELD OF THE INVENTION

The present invention relates to a holographic ROM (read only memory) system; and more particularly, to a holographic ROM system capable of preventing cross talk by adjacent tracks at a low cost by forming its objective lens and aperture plate in a single body.

BACKGROUND OF THE INVENTION

Recently, because of its high storage capacity, speedy data transfer rates and the like, a holographic ROM system is wining the widespread application to the field of data storage devices.

Referring to FIG. 1, there is shown a diagram of a conventional holographic ROM system. As shown in FIG. 1, the holographic ROM system includes a holographic disk 200, a memory medium, which stores angle-multiplexed holograms (or holographic data representations) and which is removably mounted on a spindle motor 210; a pickup module 100 for optically reading the holographic data representations from the holographic disk 200 and then producing electrical signals in response to the optically read holographic data representations; a signal processing unit 150 for processing the electrical signals from the pickup module 100; and a control unit 300 for controlling the pickup module 100 and the spindle motor 210.

The pickup module 100 is provided with a laser source 102 for generating a reference laser beam; a double-sided reflecting section 103 for reflecting the laser beam; a reflecting section 104 for reflecting the laser beam from the double-sided reflecting section 103; an aperture plate 105 for filtering an output radiation diffracted from the holographic disk 200 in order to remove undesired signals (or cross talk) by adjacent tracks from the output radiation; an objective lens 106 for collimating the output radiation to produce an output data beam; a detector 108 for producing electrical signals in response to the output data beam incident thereupon; an actuator 101 for sliding the pickup module 100 in a radial direction relative to the holographic disk 200; and a lens actuator 107 for adjusting a vertical position of the objective lens 106 relative to the holographic disk 200. The actuator 101 and the lens actuator 107 are controlled by the control unit 300.

In a process of reproducing data stored in the holographic disk 200, the reference beam generated by the laser source 102 is reflected by the double-sided reflecting section 103 and the reflecting section 104 to reach the holographic disk 200 rotated at a predetermined speed by the spindle motor 210 at an incidence angle corresponding to that of a reference light beam which was used in a recording process of the data. The holographic disk 200 produces diffracted output radiation, which is filtered by the aperture plate 105 and then collimated by the objective lens 106 to make the output data beam. The output data beam is directed by the double-sided reflecting section 103 towards the detector 108, which converts the output data beam into the electrical signals. Then, the electrical signals are transmitted from the detector 108 to the signal processing unit 150.

Referring to FIG. 2, there are illustrated portions of tracks B and C of successive holograms stored in the holographic disk 200. The tracks B and C in the holographic disk 200 are spaced by a distance A, which is, for example, about 0.74 μm, and diameter of the laser beam illuminating the holographic disk 200 to reproduce the data stored therein is of the order of several tens of micrometers. Thus, the periphery portion of the laser beam illuminates the adjacent tracks C as well as the target track B, so that cross talk by the adjacent tracks C occurs during the reading process.

To prevent such a cross talk by filtering the diffracted output radiation, the aperture plate 105 having an opening of a desired diameter is disposed between the holographic disk 200 and the objective lens 106. However, such a holographic ROM system suffers from a drawback that the center of the opening of the aperture plate 105 should be aligned with the optical axis of the objective lens 106 to minimize distortion in reconstructed signals. The process of aligning the center of the opening of the aperture plate 105 with the optical axis of the objective lens requires high accuracy and is time-consuming, thereby increasing manufacturing cost of the holographic ROM system.

SUMMARY OF THE INVENTION

It is, therefore, an object of the present invention is to provide a holographic ROM system, which can be manufactured at a low cost by integrating its objective lens and aperture plate.

In accordance with a preferred embodiment of the present invention, there is provided with a holographic ROM system, including: a lens unit for filtering and collimating an output radiation diffracted from a holographic disk in order to produce an output data beam, wherein the lens unit includes an objective lens for collimating the output radiation and a filtering film for filtering the output radiation, wherein the objective lens and the filtering film are formed in a single body.

In accordance with another preferred embodiment of the present invention, there is provided with a holographic ROM system, including: a holographic disk which stores holograms; a disk rotating device for rotating the holographic disk; a pickup module for optically reading the holograms and producing electrical signals in response to the read holograms; a signal processing unit for processing the electrical signals from the pickup module; and a control unit for controlling the disk rotating device and the pickup module, wherein the pickup module includes a laser source for generating a laser beam and a lens unit which has an objective lens for collimating an output radiation diffracted from the holographic disk, and a filtering film for preventing a cross talk beam in the output radiation from passing through the lens unit while allowing a reconstructed signal beam in the output radiation to pass therethrough, wherein the objective lens and the filtering film are formed in a single body.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

A preferred embodiment of the present invention will now be described in detail with reference to FIGS. 3 and 4.

Figure 1:
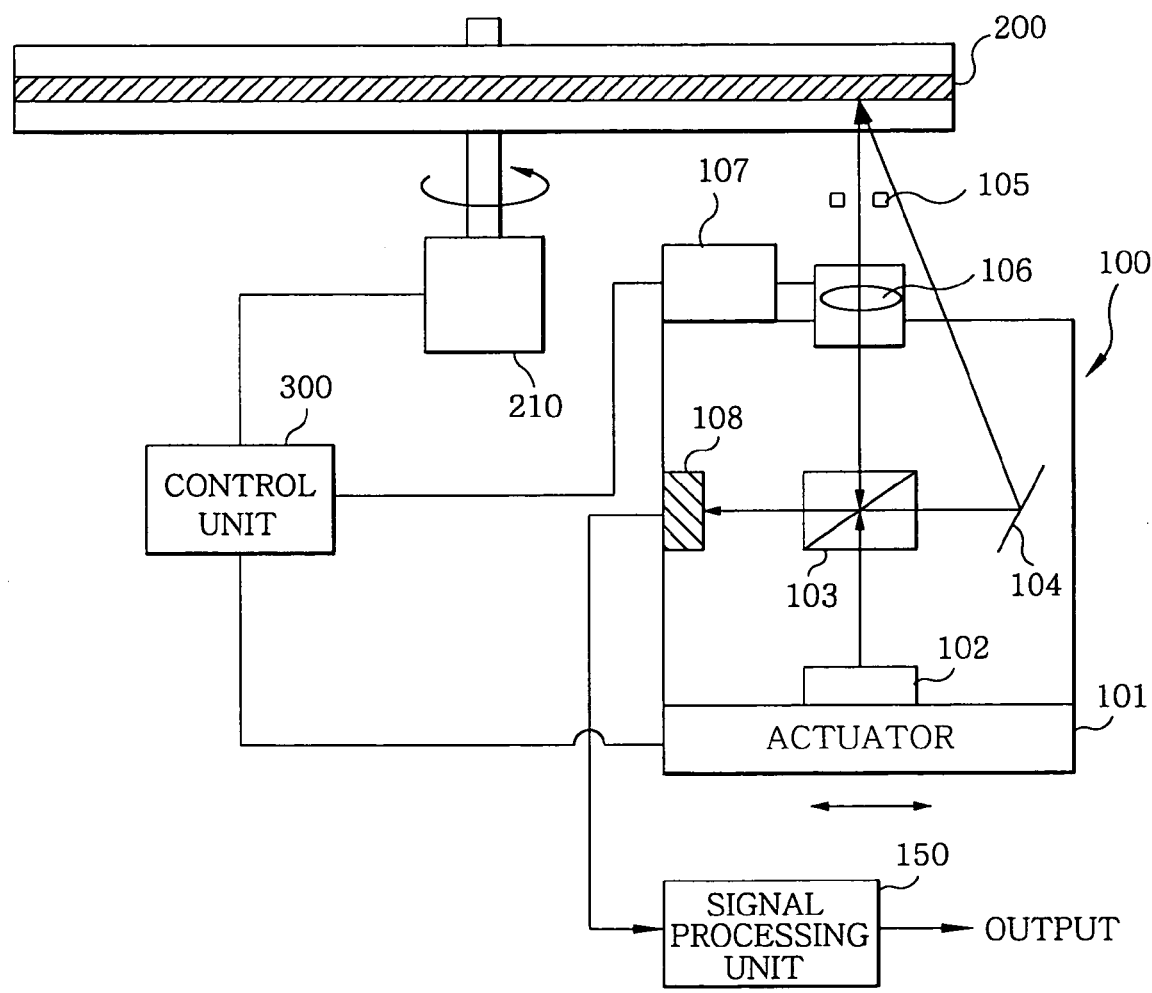
FIG. 1 illustrates a diagram of a conventional holographic ROM system.
Figure 2:
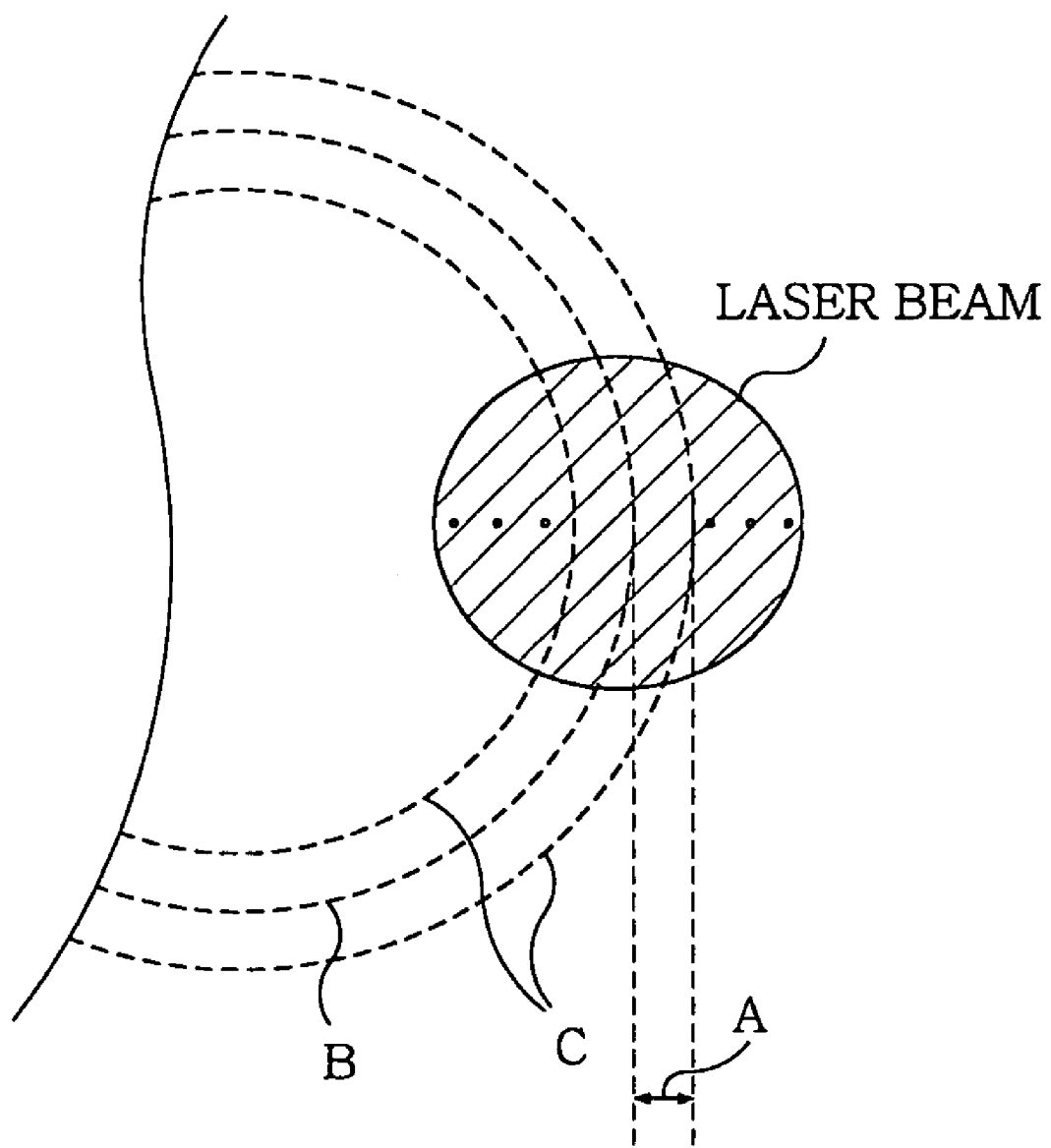
FIG. 2 presents a portion of tracks of successive holograms stored in the holographic disk.
Figure 3:
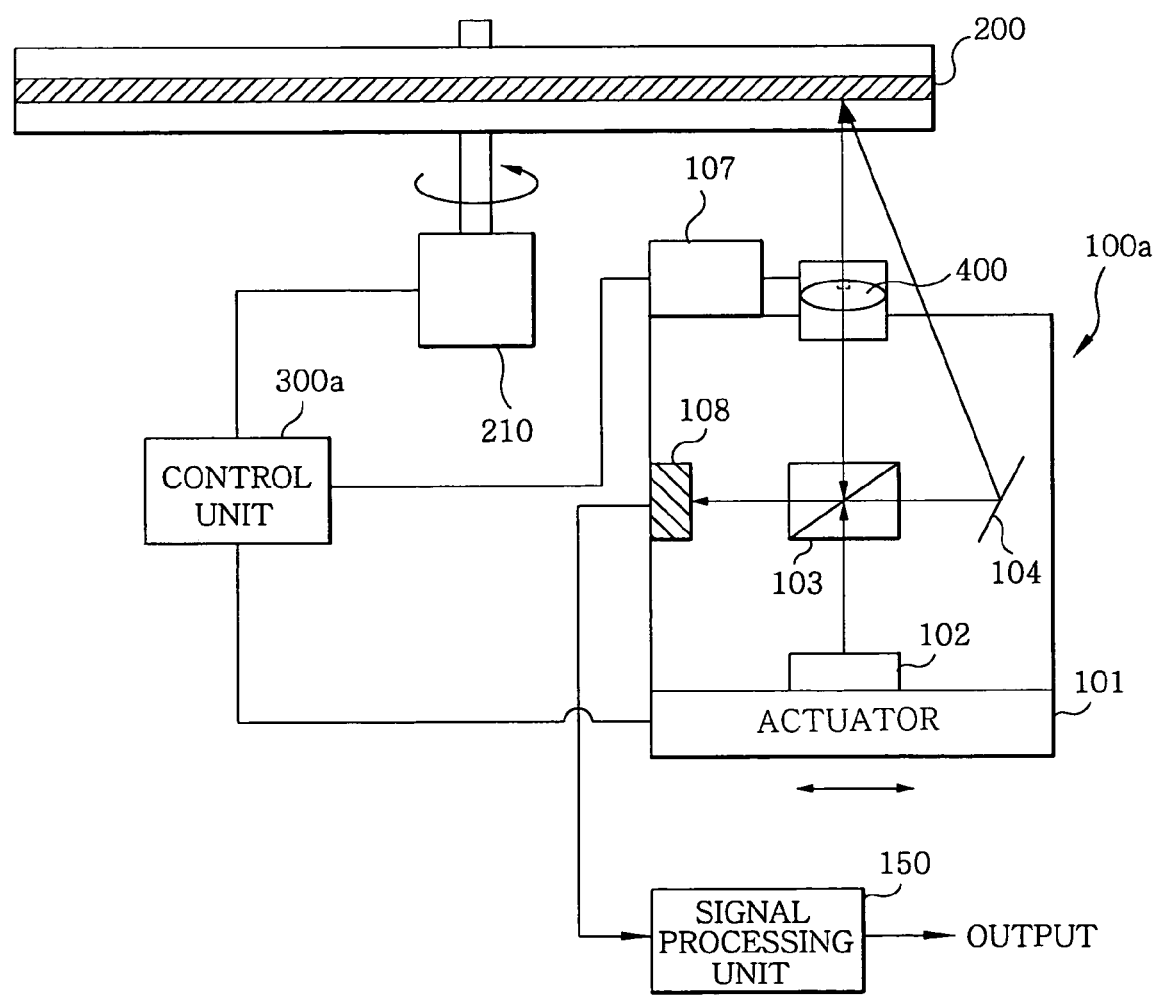
FIG. 3 depicts a diagram of a holographic ROM system in accordance with the preferred embodiment of the present invention.

Referring to FIG. 3, there is shown a schematic diagram of a holographic ROM system in accordance with the preferred embodiment of the present invention. As shown in FIG. 3, the holographic ROM system includes a holographic disk 200, a memory medium, which stores angle-multiplexed holograms (or holographic data representations), and which is removably mounted on a spindle motor 210; a pickup module 100a for optically reading the holographic data representations from the holographic disk 200 and then producing electrical signals corresponding to the optically read holographic data representations; a signal processing unit 150 for processing the electrical signals from the pickup module 100a; and a control unit 300a for controlling the pickup module 100a and the spindle motor 210.

The pickup module 100a is provided with a laser source 102 for generating a laser beam; a double-sided reflecting section 103 for reflecting the laser beam and an output data beam; a reflecting section 104 for reflecting the laser beam from the double-sided reflecting section 103; a lens unit 400 which produces the output data beam by filtering an output radiation diffracted from the holographic disk 200 in order to remove undesired signals (or cross talk) by adjacent tracks and by collimating the output radiation; a detector 108 for producing electrical signals in response to the output data beam; an actuator 101 for sliding the pickup module 100a in a radial direction relative to the holographic disk 200; and a lens actuator 107a for adjusting a vertical position of the lens unit 400 relative to the holographic disk 200. The actuator 101 and the lens actuator 107a are controlled by the control unit 300.

Figure 4:
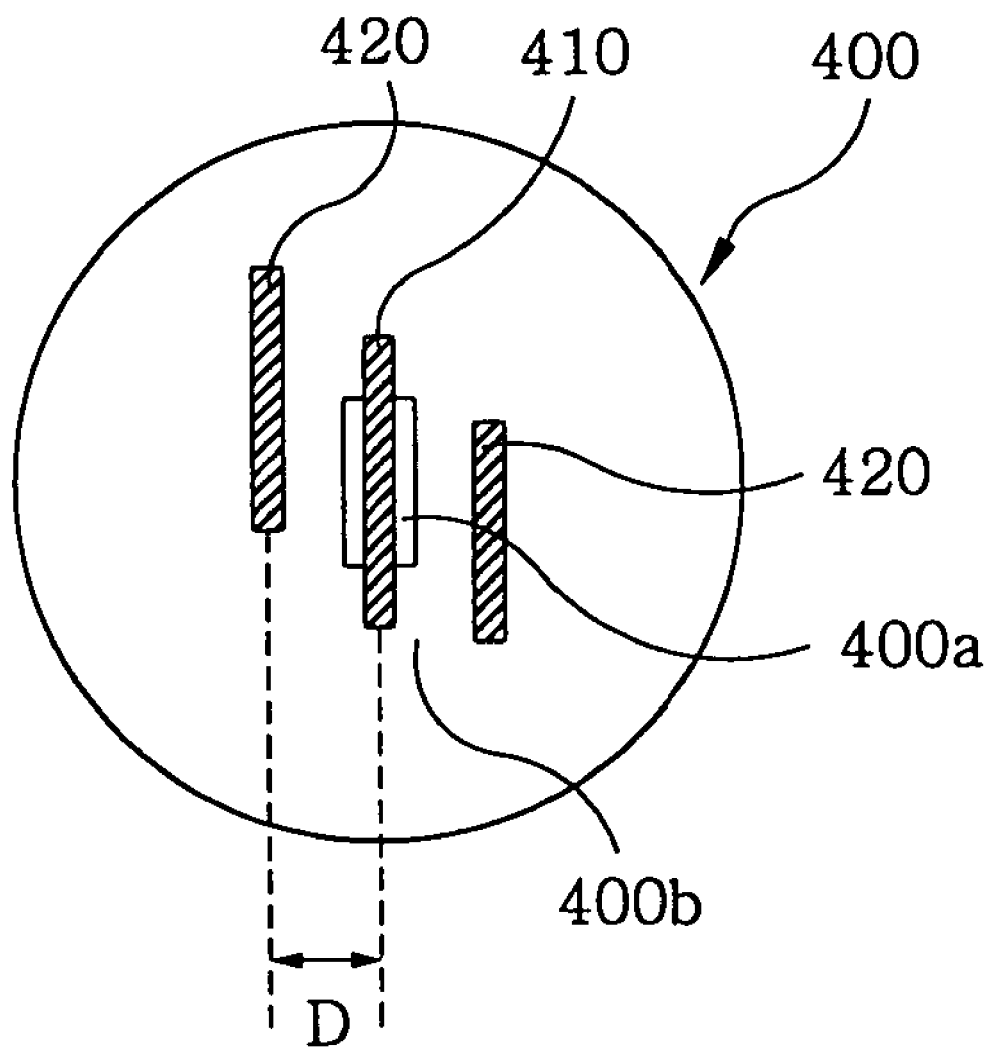
FIG. 4 offers a top view of the lens unit in accordance with the preferred embodiment of the present invention.

Referring to FIG. 4, there is presented a top view of the lens unit 400 in accordance with the preferred embodiment of the present invention, which the output radiation from the holographic disk 200 illuminates. The lens unit 400 includes an objective lens for collimating the output radiation and a filtering film for filtering the output radiation in order to prevent cross talk beams (or undesired signal beams) 420 diffracted from the adjacent tracks from passing through the lens unit 400. The objective lens and the filtering film are integrated with each other or formed in a single body. For example, the filtering film is coated on one or both surfaces of the objective lens or embedded therein. The filtering film is provided with a light-impermeable region 400b for blocking the cross talk beams 420, which covers most of the surface of the objective lens, and a light-permeable region 400a, e.g., an opening formed in the filtering film, for allowing a desired reconstruction signal beam 410 to pass through the lens unit 400, which is disposed on a central portion of the objective lens. Further, the light-permeable region 400a has a shape of square whose width is substantially equal to or greater than that of the desired reconstruction signal beam 410 and less than a distance D between the desired reconstruction signal beam 410 and one of the cross talk beams 420 just beside the desired reconstruction signal beam 410. Thus, the desired reconstruction signal beam 410 is allowed to pass through the objective lens of the lens unit 400, whereas the cross talk beams 420 containing signals reconstructed from the adjacent tracks are prevented from passing therethrough by the light-impermeable region 400b occupying the surface of the objective lens except a square portion of the objective lens corresponding to the light-permeable region 400a.

During a reading process, the beam generated by the laser source 102 is directed by the double-sided reflecting section 103 and the reflecting section 104 to reach the holographic disk 200 rotated at a predetermined speed by the spindle motor 210 at an incidence angle corresponding to that of a reference light beam which was used in a recording process. The holographic disk 200 produces the diffracted output radiation, which includes the desired reconstruction signal beam 410 and the cross talk beams 420. Then, the diffracted output radiation arrives at the lens unit 400. At the lens unit 400, cross talk beams 420 are filtered by the light-impermeable region 400b of the filtering film and the desired reconstruction signal beam 410 passes through the light-permeable region 400a of the filtering film and is collimated by the objective lens of the lens unit 400 to make the output data beam. The output data beam is directed by the double-sided reflecting section 103 into the detector 108, which converts the output data beam into the electrical signals. Then, the electrical signals are transmitted from the detector 108 to the signal processing unit 150.

As noted above, since the cross talk beams diffracted from the adjacent track are blocked by the light-impermeable region of the filtering film, the cross talk caused by the cross talk beams can be effectively prevented. Moreover, since the light-permeable region, which serves as an opening of a conventional aperture plate, can be formed in or on the objective lens by defining the light-impermeable region 400b thereon or therein, a time-consuming process of aligning the center of the opening of the aperture plate with the optical axis of the objective lens is not required. Accordingly, in accordance with the present invention, since the amount of time required for assembling the pickup module is significantly reduced, the manufacturing cost of the holographic ROM system is effectively reduced.

While the invention has been shown and described with respect to the preferred embodiments, it will be understood by those skilled in the art that various changes and modifications may be made without departing from the spirit and scope of the invention as defined in the following claims.

What is claimed is:

1. A holographic ROM system, comprising:
a lens unit for filtering and collimating an output radiation diffracted from a holographic disk in order to produce an output data beam,
wherein the lens unit includes an objective lens for collimating the output radiation and a filtering film for filtering the output radiation, wherein the objective lens and the filtering film are formed in a single body, and
wherein the filtering film is provided with a light-impermeable region for blocking at least one cross talk beam included in the output radiation and a light-permeable region for allowing a reconstruction signal beam included in the output radiation to pass through the filtering film.

2. The holographic ROM system of claim 1, wherein the light-permeable region is disposed on a central portion of the objective lens.

3. The holographic ROM system of claim 2, wherein the light-permeable region has a shape of square whose width is substantially equal to or greater than that of the reconstruction signal beam and less than a distance between the reconstruction signal beam and one of the cross talk beams just beside the reconstruction signal beam.

4. The holographic ROM system of claim 3, wherein the light-permeable region is an opening formed in the filtering film.

5. The holographic ROM system of claim 4, wherein the filtering film is coated on the objective lens.

6. The holographic ROM system of claim 4, wherein the filtering film is embedded in the objective lens.

7. A holographic ROM system, comprising:
a holographic disk which stores holograms;
a disk rotating device for rotating the holographic disk;
a pickup module for optically reading the holograms and producing electrical signals in response to the read holograms;
a signal processing unit for processing the electrical signals from the pickup module; and
a control unit for controlling the disk rotating device and the pickup module,
wherein the pickup module includes a laser source for generating a laser beam and a lens unit which has an objective lens for collimating an output radiation diffracted from the holographic disk, and a filtering film for preventing a cross talk beam included in the output radiation from passing through the lens unit while allowing a reconstructed signal beam included in the output radiation to pass therethrough, wherein the objective lens and the filtering film are formed in a single body, and
wherein the filtering film is provided with a light-impermeable region for blocking the cross talk beam and a light-permeable region for allowing the reconstruction signal beam to pass through the lens unit.

8. The holographic ROM system of claim 7, wherein the light-permeable region has a width substantially equal to or greater than that of the reconstruction signal beam and less than a distance between the reconstruction signal beam and one of the cross talk beams just beside the reconstruction signal beam.

9. The holographic ROM system of claim 8, wherein the filtering film is coated on the objective lens.

10. The holographic ROM system of claim 8, wherein the filtering film is embedded in the objective lens.

* * * * *